United States Patent
Her et al.

(10) Patent No.: US 9,946,102 B2
(45) Date of Patent: Apr. 17, 2018

(54) ALIGNMENT STRUCTURE OF LIQUID-CRYSTAL DISPLAY DEVICE AND LIQUID-CRYSTAL DISPLAY DEVICE USING THE SAME

(71) Applicant: LG Display Co., Ltd., Seoul (KR)

(72) Inventors: HyungGu Her, Paju-si (KR); KwangSoo Lee, Paju-si (KR); DoYune Kim, Paju-si (KR); JaeHong Park, Paju-si (KR); Jinsan Lim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 52 days.

(21) Appl. No.: 14/822,427

(22) Filed: Aug. 10, 2015

(65) Prior Publication Data

US 2016/0077370 A1 Mar. 17, 2016

(30) Foreign Application Priority Data

Sep. 11, 2014 (KR) .................. 10-2014-0120285
Apr. 21, 2015 (KR) .................. 10-2015-0055930

(51) Int. Cl.
*G02F 1/1345* (2006.01)
*G02F 1/1333* (2006.01)

(52) U.S. Cl.
CPC .. *G02F 1/133305* (2013.01); *G02F 1/133308* (2013.01); *G02F 2001/133322* (2013.01)

(58) Field of Classification Search
CPC ......... G02F 1/133305; G02F 1/133308; G02F 2001/133322
USPC ..................... 349/58–60, 149–152
See application file for complete search history.

(56) References Cited

U.S. PATENT DOCUMENTS

| 2011/0255000 A1 | 10/2011 | Weber et al. |
| 2012/0063113 A1* | 3/2012 | Hisakawa ......... G02F 1/133308 361/807 |
| 2013/0215359 A1* | 8/2013 | Chun .................... G02F 1/1333 349/58 |
| 2014/0218602 A1 | 8/2014 | Kim et al. |

FOREIGN PATENT DOCUMENTS

| CN | 102563468 | 7/2012 |
| CN | 103974004 | 8/2014 |

OTHER PUBLICATIONS

First Office Action for Chinese Patent Application No. CN 201510535149.4, Jan. 2, 2018, 12 Pages, (With English Translation).

* cited by examiner

*Primary Examiner* — Charles Chang
(74) *Attorney, Agent, or Firm* — Fenwick & West LLP (57) ABSTRACT

A display device includes a display panel, a plurality of flexible substrates, and an alignment structure. The display panel is disposed on a side of the transparent plate. The plurality of flexible substrates is connected to the display panel. The alignment structure is disposed on the side of the transparent plate for coupling with an external structure. It can be disposed regardless of positions of the plurality of flexible substrates to avoid the plurality of flexible substrates from being impaired by an unnecessary contact with the alignment structure. Accordingly, it is possible to avoid elements in the display device from being impaired by the alignment structure during the manufacturing process of the display device.

18 Claims, 8 Drawing Sheets

ALIGNMENT STRUCTURE OF LIQUID-CRYSTAL DISPLAY DEVICE AND LIQUID-CRYSTAL DISPLAY DEVICE USING THE SAME

CROSS-REFERENCE TO RELATED APPLICATIONS

This application claims the priority of Korean Patent Application Nos. 10-2014-0120285 filed on Sep. 11, 2014, and 10-2015-0055930 filed on Apr. 21, 2015, in the Korean Intellectual Property Office, the disclosures of which are incorporated herein by reference.

BACKGROUND

Technical Field

The present disclosure relates to an alignment structure of a liquid-crystal display device and a liquid-crystal display device using the same. More specifically, the present disclosure relates to an alignment structure of a high-resolution liquid-crystal display device that is capable of minimizing impairment of elements in the liquid-crystal display device and improving an alignment accuracy of the liquid-crystal display device with modules such as a camera module, and a liquid-crystal display device using the same.

Description of the Related Art

A liquid-crystal display (LCD) refers to a display including a liquid-crystal display panel having a liquid-crystal layer. A liquid-crystal display is driven by adjusting transmittance of a liquid-crystal display panel with respect to light from a light source such as a backlight unit. Recently, there has been an increasing demand for a liquid-crystal display device having small thickness and a minimized bezel, as well as high resolution and low power consumption A liquid-crystal display device may be used as an element of an electronic apparatus. When an LCD device is used as an element of an electronic apparatus, the LCD device is configured to be coupled with the housing of the electronic apparatus. For example, an LCD device may be used as an element of a monitor or a television and may be coupled with the housing of the monitor or the television.

When an LCD device is coupled with the housing of an electronic device, means for aligning the LCD device with the housing is required. As used herein, aligning refers to positioning the housing with respect to an LCD device as designed. Coupling refers to physically attaching or fastening an LCD device to the housing. For example, when an LCD device is coupled with the housing of a monitor, the LCD device can be aligned with the housing by aligning a position where screws are engaged. Alternatively, the LCD device and the housing may include additional fasteners for coupling one with the other. For example, the frame of the LCD device may have protruding fasteners and the fasteners corresponding to the housing are engaged by mating with each other. Thus, the LCD device can be aligned with the housing and fixed in its position.

As electronic devices develop, various modules such as a such as a camera module, a variety of sensor modules, a controller board, etc. are included in electronic devices. Accordingly, it has also become important for electronic devices to align an LCD device with various modules as well as with the housing. Further, in some cases, an LCD device may be aligned with the housing by aligning the LCD device with a module. In such cases, an alignment accuracy of the LCD device with the module is especially important. Accordingly, various types of ways for increasing an alignment accuracy of the LCD device with the module are employed.

Figure 1:
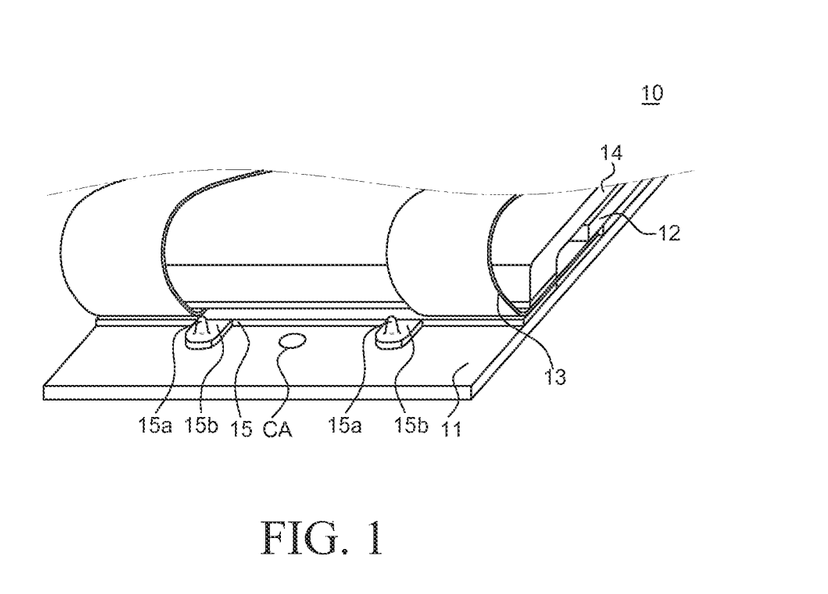
FIG. 1 is a schematic perspective view of an existing LCD device.

FIG. 1 is a schematic perspective view of an existing LCD device 10. FIG. 1 schematically shows an external portion of the existing LCD device 10 including a support 15 for coupling with a camera module. Referring to FIG. 1, the existing LCD device 10 includes a transparent plate 11, a liquid-crystal display panel 12, a flexible substrate 13, a first chassis 14, and a support 15.

Referring to FIG. 1, the support 15 of the existing LCD device 10 includes a pair of projections 15b extended away from the liquid-crystal display panel 12. The projections 15b are disposed adjacent to the flexible substrate 13 connected to the liquid-crystal display panel 12. The projections 15b has a guide unit 15a formed thereon for guiding the alignment of the camera module 17. The guide unit 15a has a cone-like shape or an inclined cylinder-like shape protruding from the respective projection 15b of the support 15. The guide unit 15a is a part of the support 15 and is integrated with the respective projection 15b. A camera area CA is formed between a pair of projections 15b.

The camera module 17 aligned with the LCD device 10 has openings 18 that may be aligned with the respective guide units 15a. Each of the guide units 15a of the LCD device 10 is inserted into the respective openings 18 of the camera module 17 so that the LCD device 10 is aligned with and coupled with the camera module 17. By doing so, a camera lens 19 of the camera module 17 can be located in the center of the camera area CA. As the camera module 17 is coupled with the housing, the LCD device 10 can also be aligned with and coupled with the housing via the camera module 17 aligned with the guide units 15a.

As LCD devices advance, the demand for LCD devices having smaller thickness and higher resolution is increasing. If such an LCD device having smaller thickness and higher resolution is coupled with a module by using existing guide units integrated with a support, many defects may occur and the alignment accuracy may be lowered.

In fact, an increase in resolution of an LCD device means an increase in the number of pixels per unit area of the LCD device. In addition, as the number of pixels increases, the numbers of driving circuits for controlling the pixels and lines connected thereto also increase. As the numbers of the driving circuits and lines increase, the number of flexible substrates on which the lines or the driving circuits are formed has to be increased. Or, a flexible substrate having a larger area is required. Flexible substrates may be, for example, a chip-on-film (COF) or a flexible printed circuit board (FPCB).

In existing LCD devices, the projections having guide units are disposed adjacent to flexible substrates. As the number or area of the flexible substrates increases, the flexible substrates are disposed more densely. Therefore, in an LCD device having high resolution, the projections having guide units may overlap with the flexible substrates.

The inventors of the application have discovered that if flexible substrates are overlapped with the projections with guide units, the flexible substrates may collide with the guide units during the manufacturing process. Thus, the flexible substrates may be subjected to impact, and the guide units may collide with the flexible substrates, causing lines formed on the flexible substrates to be impaired.

SUMMARY

In view of the above, an object of the present disclosure is to provide an alignment structure, in which a guide unit is not integrated with a body unit, for aligning a high-resolution LCD device with an external module without impairing elements of the LCD device such as flexible substrates, and a liquid-crystal display (LCD) device using the same.

Another object of the present disclosure is to provide an alignment structure for aligning a high-resolution LCD device with an external module capable of achieving high alignment accuracy of the LCD device, and an LCD device using the same.

Yet another object of the present disclosure is to provide an alignment structure in which adhesion between a guide unit and a body unit configured as separate pieces is enhanced and a tilt of the guide unit is suppressed or prevented, and an LCD device using the same.

It should be noted that objects of the present disclosure are not limited to the above-described objects, and other objects of the present disclosure will be apparent to those skilled in the art from the following descriptions.

According to an aspect of the present disclosure, there is provided a display device. The display device includes a display panel, a plurality of flexible substrates, and an alignment structure. The display panel is disposed on a side of the transparent plate. The plurality of flexible substrates is connected to the display panel. The alignment structure is disposed on the side of the transparent plate to be coupled with an external structure, and can be disposed regardless of positions of the plurality of flexible substrates to avoid the plurality of flexible substrates from being impaired by an unnecessary contact with the alignment structure. Accordingly, it is possible to avoid elements in the display device from being impaired by the alignment structure during the manufacturing process of the display device.

The alignment structure may allow at least one of the plurality of flexible substrates to overlap the alignment structure.

The alignment structure may include a body unit and a guide unit separable from each other.

The body unit may include an opening where at least one of the plurality of flexible substrates is overlapped, and the guide unit may be inserted into the opening of the body unit.

The top diameter of the opening of the body unit may be equal to or larger than a bottom diameter of the opening of the body unit.

The guide unit may include: a base having a shape conforming to a shape of the opening of the body unit and inserted into the opening of the body unit; and a boss for aligning the external structure with the alignment structure.

At least one of a distance between a center of the opening and a center of the boss, a distance between the center of the opening and a center of the base, and a distance between the center of the base and the center of the boss may be equal to or less than 0.07 mm, so that an alignment accuracy between the external structure and the alignment structure is increased.

The difference between a top diameter of the opening of the body unit and a top diameter of the base, or the difference between a bottom diameter of the opening of the body unit and a bottom diameter of the base may be equal to or less 0.02 mm.

The display device may further include: an adhesive disposed between the guide unit and the body unit to fix the guide unit on the transparent plate.

The bottom side of the guide unit may include at least one seating side to be in direct contact with the transparent plate, and an adhesive side to be in direct contact with the adhesive.

The bottom side of the guide unit may include a concave portion defined by the adhesive side so as to increase a contact area between the guide unit and the adhesive.

The at least one seating side may include three or more seating sides spaced apart from one another, so that a tilt of the guide unit caused by the adhesive is suppressed or prevented.

According to another aspect of the present disclosure, there is provided a display device. The display device includes: a guide post attached to a particular position on a transparent plate by an adhesive material. The guide post has a structure which prevents tilting thereof such that an alignment of an external structure with the guide unit is facilitated during a process of mounting the external structure on the transparent plate.

The guide post may include at least one seating portion having a structure which takes into account at least one property of viscosity, hardness, and adhesion of the adhesive.

The external structure may be a camera module, and the size, shape, and position of the seating portion are determined depending on the structure, weight, and material of the camera module.

In one embodiment, the adhesive is not be disposed between the bottom side of the seating portion and the transparent plate.

According to an aspect of the present disclosure, there is provided a display device. The display device includes a display panel having a flexible substrate connected thereto, and an alignment structure. The alignment structure may be coupled with an external structure, and includes a body unit having a height lower than a height of the flexible substrate when it is spread out.

The alignment structure may further include a guide unit capable of coupling with the external structure. The guide unit is coupled with the body unit after a process of bending the flexible substrate, and protrudes farther than the body unit.

The display device may further include: a transparent plate on which the display panel and the alignment structure are attached. A part of a bottom side of the guide unit comes in direct contact with the transparent plate so as to increase an alignment accuracy between the alignment structure and the external structure.

Particulars in the exemplary embodiments of the present disclosure will be described in the detailed description with reference to the accompanying drawings.

According to the present disclosure, an LCD device is provided with an alignment structure which can be disposed regardless of positions of flexible substrates, e.g., by having a detachable guide unit, thereby avoiding the flexible substrates from being impaired when the flexible substrates are disposed in the LCD device.

According to the present disclosure, an alignment accuracy between an LCD device and a module such as a camera module can be enhanced as an opening of a body unit of an alignment structure and a guide unit thereof to be inserted into the opening of the body unit have predetermined dimensions for achieving high alignment accuracy.

According to the present disclosure, a guide unit may have a concave portion for increasing a contact area. In one embodiment, a part of a bottom side of the guide unit comes in direct contact with a transparent plate without an adhesive, so that adhesion between the guide unit and the transparent plate can be enhanced and a tilt of the guide unit can be suppressed or prevented.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION OF THE
PREFERRED EMBODIMENT

Advantages and features of the present disclosure and methods to achieve them will become apparent from the descriptions of exemplary embodiments herein below with reference to the accompanying drawings. However, the present disclosure is not limited to the exemplary embodiments disclosed herein but may be implemented in various different ways. The exemplary embodiments are provided for making the disclosure thorough and for fully conveying the scope of the present disclosure to those skilled in the art. It is to be noted that the scope of the present disclosure is defined only by the claims.

The figures, dimensions, ratios, angles, and numbers of elements given in the drawings are merely illustrative and are not limiting. Like reference numerals denote like elements throughout the descriptions. Further, in describing the present disclosure, descriptions on well-known technologies may be omitted in order not to obscure the gist of the present disclosure. It is to be noted that the terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," this includes a plural of that noun unless specifically stated otherwise.

In describing elements, they are interpreted as including error margins even without explicit statements.

In describing positional relationship, such as "an element A on an element B," "an element A above an element B," "an element A below an element $B_i$" and "an element A next to an element B," another element C may be disposed between the elements A and B unless the term "directly" or "immediately" is explicitly used.

As used herein, a phrase "an element A on an element B" means that the element A may be disposed directly on the element B and/or the element A may be disposed indirectly on the element B via another element C.

As used herein, the terms first, second, etc., are used for distinguishing between similar elements and not necessarily for describing a sequential or chronological order. Theses terms are used to merely distinguish one element from another. Accordingly, as used herein, a first element may be a second element within the technical scope of the present disclosure.

Like reference numerals denote like elements throughout the descriptions.

The drawings are not to scale and the relative dimensions of various elements in the drawings are depicted schematically and not necessarily to scale.

Features of various exemplary embodiments of the present disclosure may be combined partially or totally. As will be clearly appreciated by those skilled in the art, technically various interactions and operations are possible. Various exemplary embodiments can be practiced individually or in combination.

Hereinafter, exemplary embodiments of the present disclosure will be described in detail with reference to the accompanying drawings.

Figure 2:
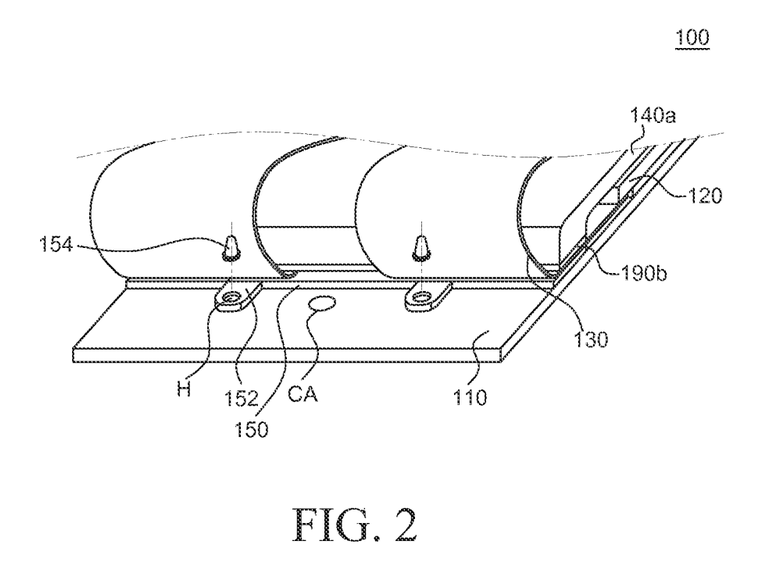
FIG. 2 is a schematic perspective view of an LCD device according to an exemplary embodiment of the present disclosure.
Figure 3:
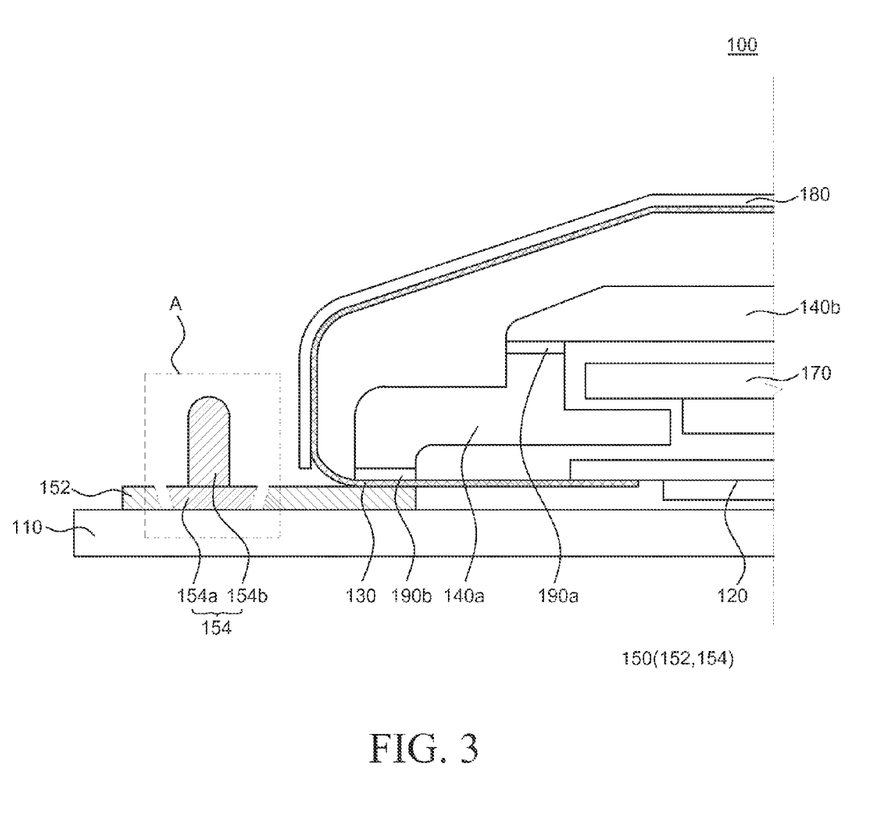
FIG. 3 is a schematic cross-sectional view of an LCD device according to an exemplary embodiment of the present disclosure.

FIG. 2 is a schematic perspective view of an LCD device 100 according to an exemplary embodiment of the present disclosure. FIG. 3 is a schematic cross-sectional view of an LCD device 100 according to an exemplary embodiment of the present disclosure. In FIG. 2, guide units 154 of the alignment structure 150 are not coupled with a body unit 152 of the alignment structure 150, for convenience of illustration. FIG. 3 is a cross-sectional view for illustrating the guide units 154 of the LCD device 100 coupled with the body unit 152. The LCD device 100 includes a liquid-crystal display panel 120, a flexible substrate 130, a first chassis 140a, a second chassis 140b, a light guide plate 170, a transparent plate 110, an alignment structure 150 including guide units 154 and the body unit 152, and a shielding unit 180.

The liquid-crystal display panel 120 is driven in such a manner that the amount of light coming from the backlight is controlled by adjusting orientations of liquid-crystals. Then, the light passes through a color filter to represent colors. The liquid-crystal display panel 120 includes a plurality of transistors and a liquid-crystal layer, etc, and includes a driving part for driving the plurality of transistors and liquid-crystal cells. Although the display device including the liquid-crystal display panel 120 is described herein, this is merely illustrative. The display device may be an organic light-emitting display panel.

The transparent plate 110 is disposed under and attached to the liquid-crystal display panel 120. The transparent plate 110 may be made of a material having flexibility such as polyimide or glass. The transparent plate 110 has a larger area than the liquid-crystal display panel 120. At least a part of the transparent plate 110 may be coated such that it is opaque, except the area where the liquid-crystal display panel 120 is disposed to display an image and the camera area CA where a camera is disposed.

The first chassis 140a is disposed at the edge of the liquid-crystal display panel 120. The first chassis 140a blocks foreign matter from being introduced via the lateral side of the LCD device 100 to protect the LCD device 100.

The first chassis 140a may be made of, for example, a plastic material in order to suppress the liquid-crystal display panel 120 from being electrically connected to other elements. A connecting member 190b is disposed on the bottom side of the first chassis 140a.

Referring to FIGS. 2 and 3, the LCD device 100 is coupled with the liquid-crystal display panel 120 and includes the flexible substrate 130 extended away from the liquid-crystal display panel 120. The liquid-crystal display panel 120 includes a substrate on which thin-film transistors for driving pixels of the liquid-crystal display panel 120 are disposed. The flexible substrate 130 is connected to a conductive pad disposed on the substrate. The flexible substrate 130 is extended from the liquid-crystal display panel 120 to pass under the connecting member 190b under the first chassis 140a. The flexible substrate 130 is extended under the first chassis 140a to be bent. The bent flexible substrate 130 comes in contact with the shielding unit 180 for protecting the flexible substrate 130 and is extended together with the shielding unit 180. The first chassis 140a fixes a part of the flexible substrate 130 thereto. The flexible substrate 130 is bent as it passes under the first chassis 140a. Accordingly, the first chassis 140a and the connecting member 190b under the first chassis 140a support a part of the flexible substrate 130, so that the flexible substrate 130 can be supported more securely.

The alignment structure 150 is formed between the first chassis 140a and the transparent plate 110. The alignment structure 150 is attached to a side of the transparent plate 110 and is disposed outside the liquid-crystal display panel 120. The alignment structure 150 includes a pair of bodies 152 extended away from the liquid-crystal display panel 120. The alignment structure 150 can be disposed regardless of the position of the flexible substrate 130 to avoid the flexible substrate 130 from being impaired by unnecessary contact with the alignment structure 130. For example, referring to FIG. 2, the body unit 152 of the alignment structure 150 has a top side parallel to the transparent plate 110. In addition, the body unit 152 of the alignment structure 150 has a height lower that that of the flexible substrate 130 when the flexible substrate 130 is spread out. Further, the body unit 152 of the alignment structure 150 includes an opening H to be coupled with the guide unit 154. Although the opening H has a circular shape in FIG. 2, this is merely illustrative and the opening H may have a variety of shapes.

A liquid-crystal display panel 120 with a higher resolution has more pixels per unit area. As the number of pixels increases, the numbers of lines and driving circuits for controlling the pixels also increase. Thus, the area and the number of the flexible substrate(s) 130 may be increased. As the area and number of the flexible substrates 130 increase, the distance between the flexible substrates 130 is reduced. Referring to FIG. 2, the flexible substrate 130 overlaps with the pair of bodies 152 extended from the alignment structure 150.

When the liquid-crystal display panel 120 having the flexible substrate 130 connected thereto is coupled with the transparent plate 110, the flexible substrate 130 is not bent yet but is spread out. Accordingly, when the liquid-crystal display panel 120 having the flexible substrate 130 connected thereto is coupled with the transparent plate 110, the flexible substrate 130 overlaps the body unit 152 and the opening H of the alignment structure 150. Then, the spread out part of the flexible substrate 130 outside the first chassis 140a is bent and is tightly attached to the shielding unit 180.

The LCD device 100 according to the exemplary embodiment of the present disclosure includes the opening H for coupling the body unit 152 of the alignment structure 150 with the guide unit 154. It also includes the guide unit 154, which may impair the flexible substrate 130, that is not disposed until the liquid-crystal display panel 120 having the flexible substrate 130 connected thereto is coupled with the transparent plate 110. Accordingly, even if the distance between flexible substrates 130 is reduced for achieving higher resolution and the flexible substrate 130 overlaps the body unit 152, the flexible substrate 130 can avoid being impaired by the guide unit 154.

The alignment structure 150 includes the guide unit 154 to be inserted into the opening H of the body unit 152. The guide unit 154 is to guide the position of an additional module such as a camera module for aligning with the LCD device 100. As shown in FIG. 2, the guide unit 154 is an element of the alignment structure 150. The guide unit 154 is inserted into the opening H of the body unit 152 after the flexible substrate 130 has been bent.

The guide unit 154 has a base 154a and a boss 154b. The guide unit 154 has a shape conforming to that of the opening H of the alignment structure 150. Specifically, if the opening H has an inclined cylinder shape, the base 154a of the guide unit 154 also has the inclined cylinder shape. If the opening H has a polyhedral shape, the base 154a also has the identical polyhedral shape. The opening H has an inclined side conforming to that of the base 154a. Referring to FIG. 2, the opening H of the alignment structure 150 has a circular shape. In addition, referring to FIG. 3, the area of the bottom side of the opening H is smaller than that of the top side. In accordance with this, the area of the bottom side of the base 154a is smaller than that of the top side where the boss 154b is formed. Accordingly, the inclined side of the opening H and that of the base 154a may conform to each other. Since the inclined side of the opening H conforms to that of the base 154a, the guide unit 154 can be easily fixed to the body unit 154 when the guide unit 154 is inserted into the opening H of the body unit 152.

The boss 154b refers to a portion protruding from the base 154a and has an inclined cylinder-like shape having a convex top side. The boss 154b may have a shape conforming to the opening for aligning a module such as a camera module. For example, if the opening has a cylinder-like shape, the boss 154b may also have the cylinder-like shape.

In the LCD device 100 according to the exemplary embodiment of the present disclosure, since the guide unit 154 is coupled with the body unit 152 after the flexible substrate 130 has been bent, the guide unit 154 does not collide with the flexible substrate 130 when the liquid-crystal display panel 120 having the flexible substrate 130 connected thereto is attached to the transparent plate 110. Accordingly, the flexible substrate 130 can be disposed without being impaired.

In some embodiments, however, the guide unit 154 and the alignment structure 150 may be defined as separate pieces. That is, a guide unit and an alignment structure having an opening via which the guide unit can be coupled may be defined.

The light guide plate 170 is disposed above the liquid-crystal display panel 120. The light guide plate 170 is, for example, an element for guiding light from a backlight such as a light-emitting diode (LED) disposed on a side of the LCD device 100 so that the light propagates uniformly toward the liquid-crystal display panel 120. An optical layer 172 via which light from the light guide plate 170 passes is formed between the light guide plate 170 and the liquid-crystal display panel 120. The optical layer 172 may be either a single layer or a plurality of layers performing a variety of optical functionalities. The optical layer 172 may perform the light collecting function or the light dispersing function, for example.

Referring to FIG. 3, the second chassis 140b is disposed above the light guide plate 170. The second chassis 140b blocks foreign matter from being introduced via the top of the LCD device 100 to protect the LCD device 100 from impact or the like. Although the top and bottom sides of the second chassis 140b are flat in FIG. 3, this is merely illustrative. The top and bottom sides of the second chassis 140b may have a partially protruding shape or a structure for supporting a variety of elements depending on design choices. If the second chassis 140b is made of a metal, a part of the second chassis 140b may be made insulative so that it is not electrically connected to other elements. The second chassis 140b is coupled with the first chassis 140a by a connecting member 190a.

As shown in FIGS. 2 and 3, in the LCD device 100 according to the exemplary embodiment of the present disclosure, the guide unit 154 is coupled with the body unit 152 after the flexible substrate 130 is bent. Accordingly, for a high resolution LCD device having more and larger flexible substrates, when the flexible substrates overlap the body unit 152 of the alignment structure 150 to be coupled therewith, it is possible to avoid the flexible substrates 130 from being impaired by unnecessary contact with the guide unit 130. As a result, defects in the LCD device 100 caused by impaired flexible substrates 130 can be reduced.

Figure 4:
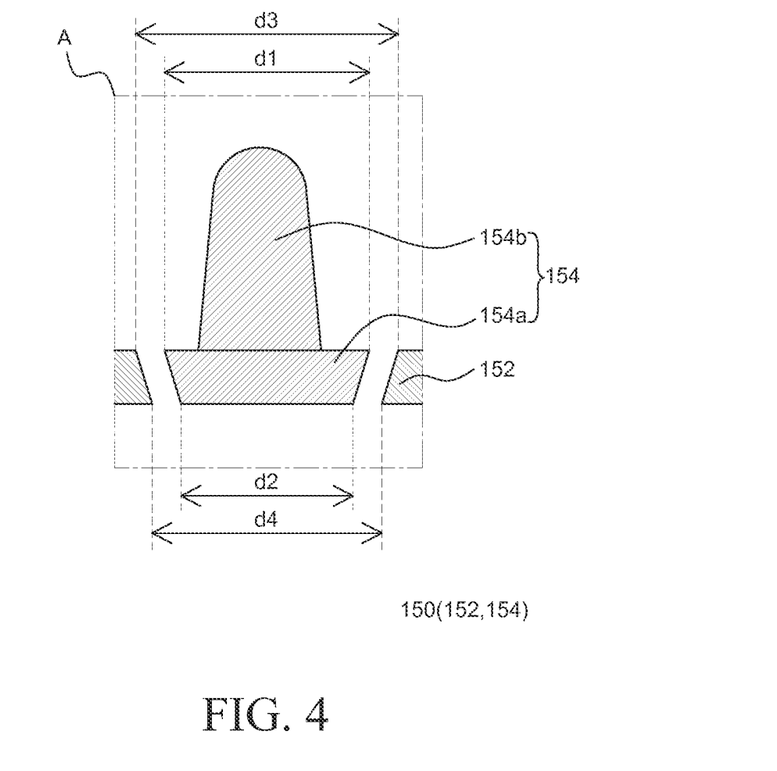
FIG. 4 is an enlarged cross-sectional view of area A shown in FIG. 3, according to an exemplary embodiment of the present disclosure.

FIG. 4 is an enlarged cross-sectional view of area A shown in FIG. 3. In FIG. 4, the distance between the base 154a and the body unit 152 is exaggerated for the purpose of clarity. Although the base 154a and the opening H have a cylinder-like shape in FIG. 4, this is merely illustrative. The base 154a and the opening H may have a variety of shapes including a polyhedral shape.

The base 154a has a cylinder-like shape in which the area of the top circle is different from the area of the bottom circle. The opening H of the body unit 152 has an inclined cylinder-like shape so as to conform to the shape of the base 154a. In FIG. 4, the top diameter d1 of the base 154a is larger than the bottom diameter d2 of the base 154a. In addition, the top diameter d3 of the opening H is equal to or larger than the bottom diameter d4. The top diameter d1 of the base 154a and the top diameter d3 of the opening H are larger than the bottom diameter d2 of the base 154a and the bottom diameter d4 of the opening H, respectively. Accordingly, when the guide unit 154 is inserted into the opening H of the body unit 152, the guide unit 154 can be more easily inserted into and secured to the body unit 152

The boss 154b protrudes from the base 154a and has a cylinder-like shape having a convex top side. The bottom diameter d5 of the boss 154b is smaller than the top diameter d1 of the base 154a.

In one embodiment, in order to accurately align the LCD device 100 with a module, the top and bottom diameters d1 and the d2 of the base 154a and the top and bottom diameters d3 and d4 of the opening H are very precisely controlled. If the dimensions of the top and bottom diameters d1 and d2 of the base 154a and the top and bottom diameters d3 and d4 of the opening H are not controlled, the guide unit 154 may not be inserted into the opening H of the body unit 152. Even if the guide unit 154 can be inserted into the opening H, the boss 154b may be inclined in an unwanted direction.

However, only individually controlling dimensions of the diameters may not be sufficient to achieve a desired alignment accuracy. For example, it may be contemplated to control the dimensions of the guide unit 154 so that the lengths of the top diameter d1 of the base 154a and the bottom diameter d4 of the opening H lie within a specific range. In doing so, however, the top diameter d3 of the opening H is smaller than the top diameter d1 of the base 154a, so that the base 154a may not accurately be in tight contact with the opening H. If the base 154a fails to be accurately coupled with the opening H, an alignment error may occur when the module is coupled with the guide unit 154. If an alignment error occurs, a gap may be created between the housing connected to the module and the LCD device. Furthermore, in the case of a thin housing, a gap between the housing and the LCD device 100 may be too large, possibly preventing the module from being coupled with the LCD device 100. Accordingly, accurate alignment between the base 154a and the opening H is not just a matter of alignment between the LCD device 100 and a module, but may also be a factor affecting the reliability of the LCD device 100.

In the LCD device 100 according to the exemplary embodiment of the present disclosure, deviations between the bottom diameters d2 and d4 and the top diameters d1 and d3 of the opening H and the base 154a are controlled, so that the alignment accuracy can be improved. In FIG. 4, a value obtained by subtracting the top diameter d1 of the base 154a from the top diameter d3 of the opening H is greater than zero and equal to or less than 0.02 mm. In addition, a value obtained by subtracting the bottom diameter d2 of the base 154a from the bottom diameter d4 of the opening H is greater than zero and equal to or less than 0.02 mm. That is, a difference between the top diameter d3 of the opening H and the top diameter d1 of the base 154a and/or a difference between the bottom diameter d4 of the opening H and the bottom diameter d2 of the base 154a is equal to or less than 0.02 mm.

As long as the deviation between the bottom diameter d2 of the base 154a and the bottom diameter d4 of the opening H and the deviation between the top diameter d1 of the base 154a and the bottom diameter d3 of the opening H lie within 0.02 mm, the inclined side of the opening H comes into tight contact with the inclined side of the base 154a. Further, the boss 154b is located at a desired position. As a result, a defect caused by an alignment error between the LCD device and the module can rarely occur. Further, the base 154a of the guide unit 154 is in tight contact with the opening H. Thus, the position of the guide unit 154 can be securely fixed.

If a difference between the top diameter d1 of the base 154 and the top diameter d3 of the opening H and/or a difference between the bottom diameter d2 of the base 154 and the bottom diameter d4 of the opening H exceeds 0.02 mm, the base 154a of the guide unit 154 is not in tight contact with the opening H. As a result, the boss 154b may be oriented either in a wrong direction or at an unwanted position. If the boss 154b is not located at a desired position, the alignment accuracy between the LCD device 100 and the module may be lowered.

Additionally, if a difference between the top diameter d1 of the base 154a and the top diameter d3 of the opening H lies within 0.02 mm, the inclined side of the opening H may come in contact with the inclined side of the base 154a. If the inclined side of the opening H comes in contact with the inclined side of the base 154a, the guide unit 154 can be inserted into and secured to the opening H.

Although not shown in the drawings, the lateral side of the base 154a may not completely conform to the lateral side of the opening H. For example, a difference between the top diameter d1 of the base 154a and the top diameter d3 of the opening H may be different from a difference between the bottom diameter d2 of the base 154a and the bottom diameter d4 of the opening H. In this case, the inclination angle of the lateral side of the opening H may be different from the inclination angle of the lateral side of the base 154a. Even if the lateral side of the base 154a does not completely conform to the lateral side of the opening H, the base 154a can still be inserted into and secured to the opening H, even though the base 154a comes in contact with the opening H at a different position.

In the LCD device 100 according to the exemplary embodiment of the present disclosure, the base 154a of the guide unit 154 can accurately come into tight contact with the opening H of the body unit 152, so that high alignment accuracy between the LCD device 100 and an external module can be achieved. To that end, as shown in FIG. 4, the dimensions can be controlled such that deviations between the diameters of the base 154a of the guide unit 154 and the diameters of the opening H of the body unit 152 lie within 0.02 mm. Accordingly, the LCD device 100 can be accurately coupled with a thin housing connected to an external module, so that reliability of the LCD device 100 can be increased.

Figure 5:
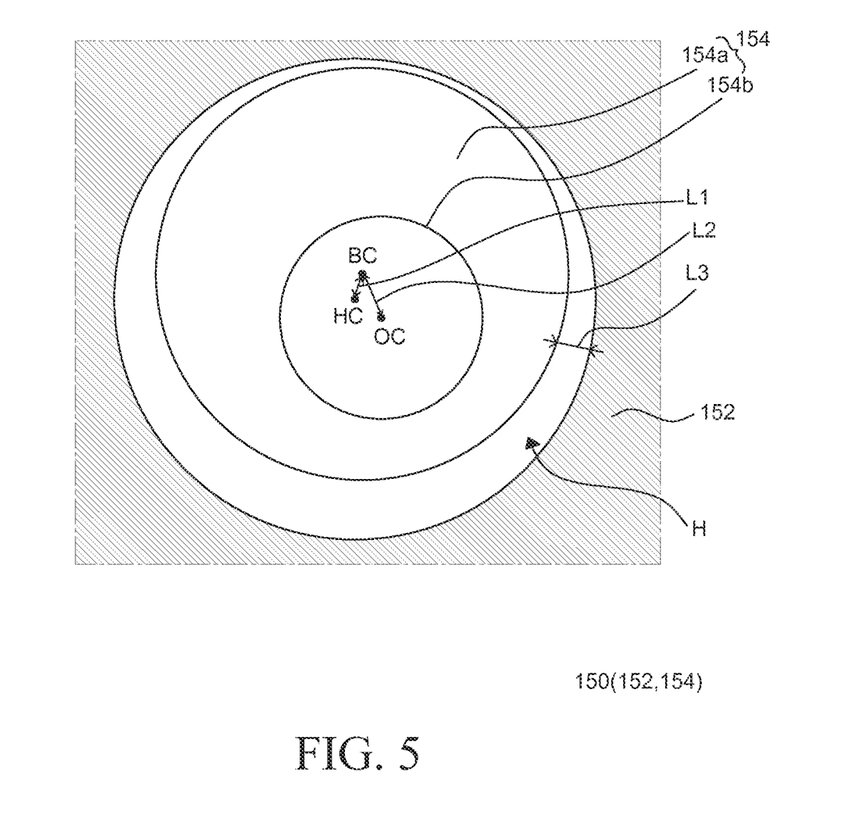
FIG. 5 is a top view illustrating the relative dimensions of a guide unit and an opening of an LCD device according to an exemplary embodiment of the present disclosure.

FIG. 5 is a top view illustrating relative dimensions between the guide unit and opening of the LCD device according to the exemplary embodiment of the present disclosure.

In the LCD device 100 according to the exemplary embodiment of the present disclosure, the guide unit 154 is accurately inserted into the opening H of the body unit 152, so that high alignment accuracy between an external module and the guide unit 154 can be achieved. In order to accurately align the LCD device 100 with an external module, not only is the guide unit 154 accurately inserted into the opening H of the body unit 152, but also the center of the opening H of the body unit 152 is aligned with the center of the guide unit 154. In other words, the concentricity between the opening H of the body unit 152 and the guide unit 154 is controlled within a certain range, in addition to the deviations between diameters of the base 154a of the guide unit 154 and the opening H.

The concentricity between the opening H of the body unit 152 and the guide unit 154 may be measured as a distance L1 between the center HC of the opening H and the center OC of the boss 154b. For example, the distance L1 between the center HC of the opening H and the center OC of the boss 154b may be equal to or less than 0.07 mm so that high alignment accuracy between an external structure and the alignment structure is achieved. When the center HC of the opening H is in line with the center OC of the boss 154b, i.e., the distance L1 between the center HC of the opening H and the center OC of the boss 154b is zero, the opening H of the body unit 152 and the guide unit 154 are concentric. If the opening H of the body unit 152 and the guide unit 154 are concentric, the guide unit 154 is accurately inserted into the opening H of the body unit 152, thus, the external module is accurately aligned with the guide unit 154. If the distance L1 between the center HC of the opening H and the center OC of the boss 154b exceeds 0.07 mm, the external module may not be accurately aligned with the guide unit 154.

The concentricity between the opening H of the body unit 152 and the guide unit 154 may be controlled by maintaining the distance L1 between the center HC of the opening H and the center OC of the boss 154b. Even if the center HC of the opening H is in line with the center OC of the boss 154b, however, the center BC of the base 154a may not be in line with the center HC of the opening H or with the center OC of the boss 154b. When this happens, although the guide unit 154 may be accurately aligned with the external module, the guide unit 154 may not be securely coupled with the opening H of the body 152. In addition, if the center BC of the base 154a is not in line with the center OC of the boss 154b, even the alignment between the guide unit 154 and the external module may not be accurate. Accordingly, the concentricity between the base 154a and the opening H and the concentricity between the base 154a and the boss 154b may also be controlled.

The concentricity between the base 154a and the opening H and the concentricity between the base 154a and the boss 154b may be measured as a distance L2 between the center BC of the base 154a and the center HC of the opening H and a distance L3 between the center BC of the base 154a and the center OC of the boss 154b, respectively.

In FIG. 5, the center BC of the base 154a is not in line with the center HC of the opening H. In order to control the concentricity between the opening H of the body unit 152 and the guide unit 154, the distance L2 between the center BC of the base 154a and the center HC of the opening H may be measured and maintained within a certain range. For example, the distance L2 between the center BC of the base 154a and the center HC of the opening H may be equal to or less than 0.07 mm so that high alignment accuracy between an external structure and the alignment structure is achieved. If the distance L2 between the center BC of the base 154a and the center HC of the opening H is equal to or less than 0.07 mm, the base 154a of the guide unit 154 is located at a desired position when the guide unit 154 is inserted into the opening H of the body unit 152. If the distance L2 between the center BC of the base 154a and the center HC of the opening H exceeds 0.07 mm, the base 154a may be leaning to one side of the opening. Accordingly, the guide unit 154 may not be accurately inserted into the opening H of the body unit 152.

In addition, Referring to FIG. 5, the center BC of the base 154a is not in line with the center OC of the boss 154b. In order to control the concentricity between the base 154a of the guide unit 154 and the boss 154b, the distance L3 between the center BC of the base 154a and the center OC of the boss 154b may be measured and maintained within a certain range. For example, the distance L3 between the center BC of the base 154a and the center OC of the boss 154b may be equal to or less than 0.07 mm so that high alignment accuracy between an external structure and the alignment structure is achieved. If the distance L3 between the center BC of the base 154a and the center OC of the boss 154b is equal to or less than 0.07 mm, the boss 154b of the guide unit 154 is located at a desired position when the guide unit 154 is inserted into the opening H of the body unit 152. If the distance L3 between the center BC of the base 154a and the center OC of the boss 154b exceeds 0.07 mm, the LCD device 100 may not be accurately aligned with the module even though the guide unit 154 is accurately inserted into the opening H of the body unit 152.

In addition, referring to FIG. 5, a distance L4 between the inclined side of the base 154a of the guide unit 154 and the inclined side of the opening H of the body unit 152 may be equal to or less than 0.02 mm. In this regard, the distance L4 between the inclined sides may be an average distance between the base 154a and the opening H surrounding the base 154a. If the distance L4 between the inclined sides exceeds 0.02 mm, the inclined side of the opening H of the body unit 152 is not completely in contact with the inclined side of the base 154a of the guide unit 154. Thus, the guide unit 154 may not be tightly coupled with the alignment structure 150. If the guide unit 154 is not tightly coupled with the alignment structure 150, the guide unit 154 may be separated from the alignment structure 150.

In the LCD device 100 according to this exemplary embodiment of the present disclosure, the boss 154b of the guide unit 154 can be located at a desired position, and the guide unit 154 can be accurately inserted into the opening H. As shown in FIG. 5, the distance L1 between the center HC of the opening H and the center OC of the boss 154b, as well as the diameters of the base 154a and the opening H, are maintained within a certain range. Accordingly, the high alignment accuracy of the guide unit 154 with respect to an external module can be achieved. In order to further improve the alignment accuracy and to securely couple the guide unit 154 with the opening H, the distance between the center BC of the base 154a and the center HC of the opening H and the distance L3 between the center BC of the base 154a and the center OC of the boss 154b can be maintained within a certain range.

The guide unit may be attached to the transparent plate in various ways. For example, the guide unit may be attached to the transparent plate by an adhesive film. However, since the adhesion of an adhesive film is proportional to the area of the bottom side of the guide unit, the guide unit may be separated from the transparent plate if the bottom side of the guide unit is not large enough.

Instead of employing such an adhesive film, the guide unit may be attached to the transparent plate by using a liquid adhesive material. A liquid adhesive material permeates into empty spaces between the guide unit and the opening of the body unit. Accordingly, the guide unit can be attached more securely by a liquid adhesive material than by an adhesive film. For example, a liquid adhesive material may be applied onto the bottom side of the guide unit, and then the guide unit may be attached to the transparent plate. The liquid adhesive material may be hardened to become a solid adhesive material or to form an adhesive region. As a result, the completed LCD device includes the solid adhesive material. However, a liquid adhesive material has flowability and thus its thickness is not constant. Therefore, during the manufacturing process of an LCD device using a liquid adhesive material, a part of the guide unit may be located on the liquid adhesive material while the other part may be located on the transparent plate. When this happens, the height of the bottom side of the guide unit is not even, causing the guide unit to be tilted. In addition, the guide unit may be tilted depending on the viscosity, hardness, adhesion, etc. of the liquid adhesive material. The guide unit is less likely to come into direct contact with the transparent plate if the viscosity, hardness, or adhesion of the liquid adhesive material is high. Once the guide unit is tilted due to various reasons, an external module is not aligned at a desired angle or position when the external module is aligned with and coupled with the guide unit. In addition, the structure, weight, and material of an external module such as a camera module may also affect the alignment accuracy of the guide unit with the external module.

Hereinafter, an LCD device according to another exemplary embodiment of the present disclosure will be described, in which a guide unit is more securely fixed by means of a liquid adhesive material while a tilt of the guide unit is suppressed or prevented to thereby improve the alignment accuracy with an external module.

Figure 6A:
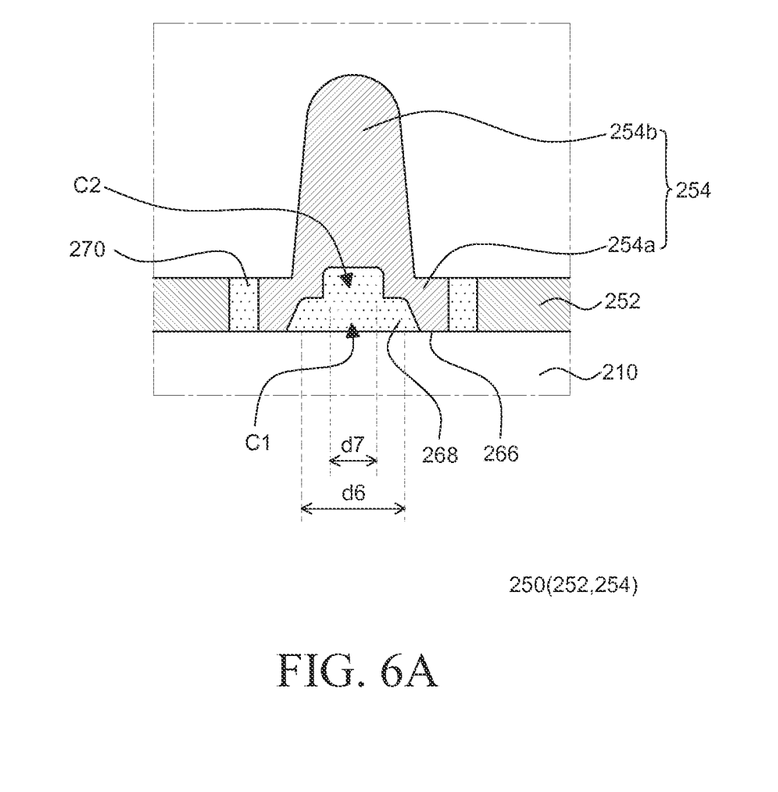
FIG. 6A is a schematic cross-sectional view of an LCD device according to an exemplary embodiment of the present disclosure.

FIG. 6A is a schematic cross-sectional view of a guide unit and body unit of an LCD device according to another exemplary embodiment of the present disclosure. The elements of the LCD device shown in FIG. 6A other than the guide unit 254 and a body unit 252 are identical to those of the LCD device 100 shown in FIG. 3; and, therefore, will not be described to avoid redundancy. Unlike in FIG. 4, the lateral sides of the opening and the guide unit 254 are not inclined in FIG. 6A. The lateral side of the guide unit 254 may be configured to be vertical to the top side of a transparent plate 210, as shown in FIG. 6A, when the guide unit 254 is too small to form an inclined lateral side.

Referring to FIG. 6A, the LCD device includes a transparent plate 210, an alignment structure having a body unit 252 and a guide unit 254, and an adhesive 270. The adhesive 270 is disposed between the guide unit 254 and the body unit 252 to fix the guide unit 254 to the transparent plate 210 in the opening. The adhesive 270 comes into contact with the top side of the transparent plate 210, the lateral side of the opening of the body unit 252, the lateral side of the base 254a of the guide unit 254, and an adhesive side 268 of the bottom side of the guide unit 254. The adhesive 270 fixes the guide unit 254 at a position where it is aligned with an external module. The body unit 252 of the alignment structure disposed on the transparent plate 210 has an opening, and the guide unit 254 is disposed in the opening. The guide unit 254 includes a base 254a and a boss 254b. The base 254a of the guide unit 254 includes a concave portion C1 in contact with the adhesive 270 for increasing the contact area between the guide unit 254 and the adhesive 270. The concave portion C1 is recessed in the base 254a. As a result, the contact area between the guide unit 254 and the adhesive 270 is increased. In some embodiments, the concave portion C1 may have an inner concave portion dented inward of the concave portion C1. By virtue of the inner concave portion C2, the contact area between the guide unit 254 and the adhesive 270 can be further increased. The concave portion C1 and the inner concave portion C2 may have a cylinder-like shape or an inclined cylinder-like shape. The diameter d6 of the concave portion C1 may be two times the diameter d7 of the inner concave portion C2. For example, the diameter d6 of the concave portion C1 may be approximately 1.98 mm, and the diameter d7 of the inner concave portion C2 may be approximately 1.00 mm. The concave portion C1 may have an inclined side so that the contact area with the adhesive 270 can be increased. Accordingly, the adhesion between the adhesive 270 and the guide unit 254 can be further enhanced by the concave portion C1.

The bottom side of the base 254a of the guide unit 254 has at least one seating side 266 to come into direct contact with the transparent plate 210, and an adhesive side 268 to come into direct contact with the adhesive 270 and define the concave portion C1. As the seating side 266 comes into direct contact with the transparent plate 210, the guide unit 254 is fixed to the transparent plate 210 regardless of the thickness of a liquid adhesive material used for the adhesive 270. Accordingly, a tilt of the guide unit 254 can be suppressed or prevented. The adhesive side 268 substantially surrounds the concave portion C1 and comes into contact with the adhesive 270 together with the lateral side of the base 254a.

Figure 6B:
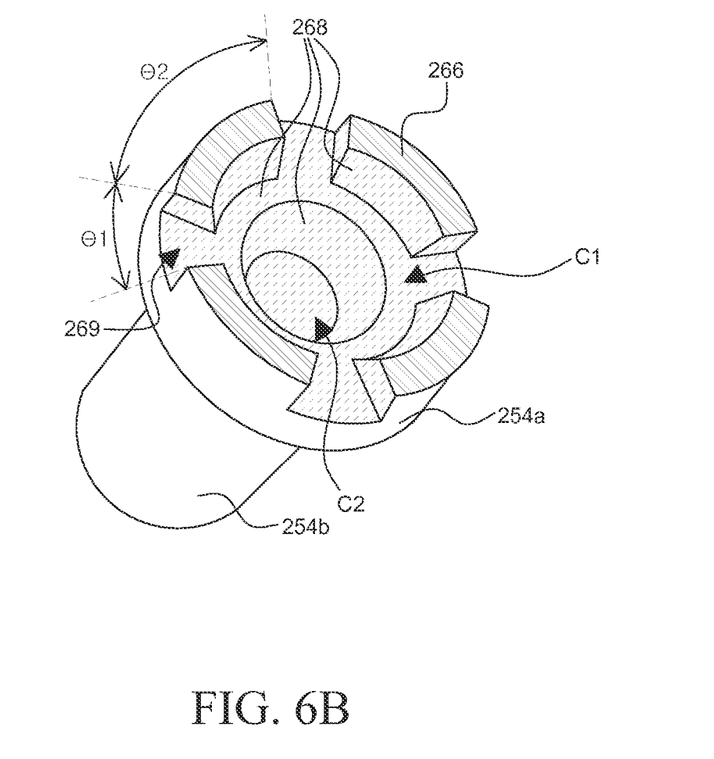
FIG. 6B is a schematic view of a guide unit of a LCD device according to an exemplary embodiment of the present disclosure.

FIG. 6B is a schematic view of the guide unit of the LCD device according to the exemplary embodiment of the present disclosure. In FIG. 6B, the adhesive side 268 and the seating side 266 are hatched using different patterns. At least three seating sides may be formed in order to reduce spacing between the guide 254 and the transparent plate 210 by the adhesive 270 to thereby be securely supported by the transparent plate 210. In the example shown in FIG. 6B, there are four seating sides. The three or more seating sides 266 may be spaced apart from one another. Accordingly, there are spaces 269 between the seating sides 266. A liquid adhesive material in its liquid state may flow out between the adhesive side 268 and the transparent plate 210 via the spaces 269. When four seating sides 266 are disposed under the guide unit 254 as shown in FIG. 6B, the angle Θ2 of the arc of each of the seating sides 266 may be approximately 60 degrees. The angle Θ1 of the arc of each space 269 may be approximately 30 degrees.

Although the seating sides 266 have a fan-like shape surrounding the bottom side of the base 254a, this is merely illustrative. The seating side 266 may be disposed at different positions in different shapes. For example, the seating sides 266 may be disposed in the center of the base 254a in a rectangular shape. Alternatively, the seating sides 266 may have a variety of shapes surrounding the center of the base 254a.

Referring to FIGS. 6A and 6B, since the guide unit 254 comes in direct contact with the transparent plate 210 via the seating sides 266 with no adhesive 270 therebetween, a tilt of the guide unit 254 caused by the adhesive 270 made of a liquid adhesive material is suppressed or prevented. Accordingly, alignment accuracy with the external structure is increased. In addition, the adhesive 270 made of a liquid adhesive material having stronger adhesion than an adhesive film can be used, so that the guide unit 254 is less likely to be separated from the transparent plate.

The alignment structure may also be referred to as a guide post. The guide post is attached at a particular position on the transparent plate 210 by the adhesive 270. The guide post may have a structure with which tilting is prevented to allow easy alignment with an external structure during a process of mounting the external structure on the transparent plate 210. In other words, the guide post may have a structure for suppressing a tilt. For example, the structure to allow easy alignment with an external structure such as a camera module may be the alignment structure shown in FIGS. 6A and 6B, but is not limited thereto.

Further, in one embodiment, the guide post includes at least one seating portion which takes into account at least one property of viscosity, hardness, and adhesion of the adhesive. Accordingly, the at least one seating portion may have a shape protruding from the bottom side of the guide post, and the bottom side of the seating portion comes into direct contact with the transparent plate 210. The at least one seating portion may have the configuration of the guide unit 254 having at least one seating portion shown in FIGS. 6A and 6B, but is not limited thereto. For example, if the adhesive has high viscosity, hardness, or adhesion, the shape of the seating portion may further protrude so that the guide unit comes into direct contact with the transparent plate. The size, shape, and position of the seating portion may be determined depending on the structure, weight, and material of the camera module. For example, if the camera module is heavy, the seating portion may have a shape that allows more areas where it comes into direct contact with the transparent plate and the adhesive. In addition, the adhesive might not be disposed between the bottom side of the seating portion and the transparent plate.

Figure 7:
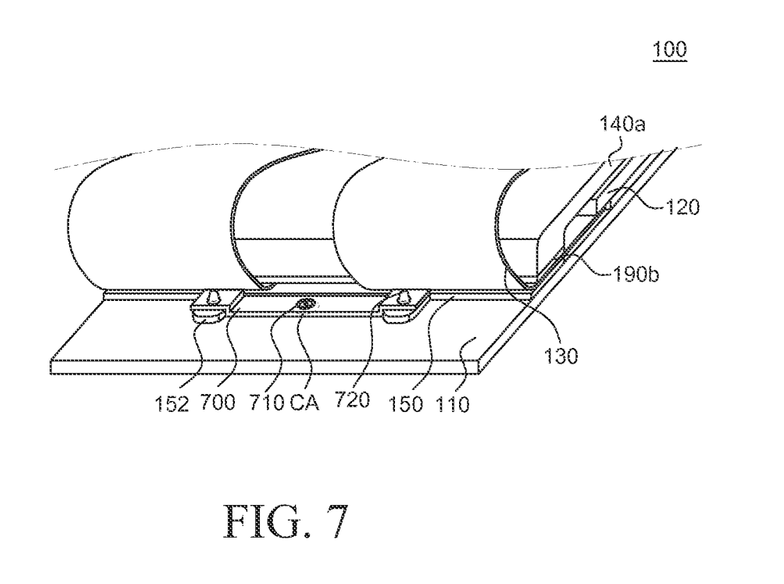
FIG. 7 is a schematic perspective view of an LCD device coupled with a camera module, according to an exemplary embodiment of the present disclosure.

FIG. 7 is a schematic perspective view of the LCD device 100 coupled with a camera module, according to an exemplary embodiment of the present disclosure. The LCD device 100 further includes a camera module 700 configured to be coupled with the guide unit 154.

Referring to FIG. 7, the camera module 700 includes a pair of openings 720 for alignment and a camera lens 710. In addition, the camera module 700 may include circuitry for driving the camera and a flash.

In one embodiment, each of the pair of openings 720 for alignment of the camera module 700 is disposed at a position where the respective boss 154b of the guide unit 154 is to be disposed. In addition, the camera lens 710 is disposed in the camera module 700 such that it is disposed at the camera area CA of the transparent plate 110 where no opaque coating is applied. Accordingly, when the camera module 700 is coupled with the LCD device 100, the bosses 154b of the guide unit 154 pass through the respective openings 720 for alignment. The bosses 154b of the guide unit 154 may be maintained in contact with the pair of the openings 720. As the bosses 154b of the guide units 154 pass through the pair of the openings 720 of the camera module 700 to be fixed, the camera module 700 is aligned with the LCD device 100. According to an exemplary embodiment of the present disclosure, as the bosses 154b of the guide unit 154 are disposed at a desired position, the camera module 700 is also disposed at a desired position if the bosses 154b pass through the pair of the openings 720 of the camera module 700.

The camera module 700 may be connected to the housing. In the LCD display device 100 according to an exemplary embodiment of the present disclosure, if the camera module 700 is connected to the housing or is integrated with the housing, the LCD device 100 can be coupled with and aligned with the housing by simply aligning the openings 720 of the camera module 700 with the bosses 154b of the guide unit 154.

Thus far, exemplary embodiments of the present disclosure have been described in detail with reference to the accompanying drawings. However, the present disclosure is not limited to the exemplary embodiments, and modifications and variations can be made thereto without departing from the technical idea of the present disclosure. Accordingly, the exemplary embodiments described herein are merely illustrative and are not intended to limit the scope of the present disclosure. The technical idea of the present disclosure is not limited by the exemplary embodiments. Therefore, it should be understood that the above-described embodiments are not limiting but illustrative in all aspects. The scope of protection sought by the present disclosure is defined by the appended claims and all equivalents thereof are construed to be within the true scope of the present disclosure.

What is claimed is:

1. A display device comprising:
   a display panel on a side of a transparent plate;
   a plurality of flexible substrates connected to the display panel; and
   an alignment structure disposed on the side of the transparent plate for coupling with an external structure and protruding away from the display panel,
   wherein the alignment structure is configured to be disposed regardless of positions of the plurality of flexible substrates to avoid the plurality of flexible substrates from being impaired by an unnecessary contact with the alignment structure,
   wherein the alignment structure comprises a body unit and a guide unit separable from each other,
   wherein the body unit comprises an opening that at least one of the plurality of flexible substrates overlaps with, and
   wherein the guide unit is inserted into the opening of the body unit.

2. The display device of claim 1, wherein the alignment structure allows at least one of the plurality of flexible substrates to be overlapped with the alignment structure.

3. The display device of claim 1, wherein a top diameter of the opening of the body unit is equal to or larger than a bottom diameter of the opening of the body unit.

4. The display device of claim 1, wherein the guide unit comprises:
   a base having a shape conforming to a shape of the opening of the body unit and inserted into the opening of the body unit; and
   a boss for aligning the external structure with the alignment structure.

5. The display device of claim 4, wherein at least one of a distance between a center of the opening and a center of the boss, a distance between the center of the opening and a center of the base, and a distance between the center of the base and the center of the boss has a value equal to or less than 0.07 mm, so that an alignment accuracy between the external structure and the alignment structure is increased.

6. The display device of claim 4, wherein a difference between a top diameter of the opening of the body unit and a top diameter of the base, or a difference between a bottom diameter of the opening of the body unit and a bottom diameter of the base has a value equal to or less than 0.02 mm.

7. The display device of claim 1, further comprising: an adhesive between the guide unit and the body unit to fix the guide unit to the transparent plate.

8. The display device of claim 7, wherein the adhesive is a liquid adhesive material.

9. The display device of claim 7, wherein a bottom side of the guide unit comprises:
   at least one seating side to be in direct contact with the transparent plate; and
   an adhesive side to be in direct contact with the adhesive.

10. The display device of claim 9, wherein the adhesive side substantially surrounds the concave portion and comes into contact with the adhesive together with a lateral side of a base.

11. The display device of claim 9, wherein the bottom side of the guide unit comprises a concave portion defined by the adhesive side to increase a contact area between the guide unit and the adhesive.

12. The display device of claim 11, wherein the at least one seating side comprises three or more seating sides spaced apart from one another, so that a tilt of the guide unit caused by the adhesive is suppressed or prevented.

13. The display device of claim 11, wherein the alignment structure further comprising:
   an inner concave portion dented inward of the concave portion,
   wherein a diameter of the inner concave portion is smaller than that of the concave portion.

14. The display device of claim 11, wherein the concave portion has an inclined side to increase the contact area between the guide unit and the adhesive.

15. A display device comprising:
   a guide post attached to a particular position on a transparent plate by an adhesive,
   wherein the guide post has a structure which prevents tilting thereof such that an alignment of an external structure with the guide post is facilitated during a process of mounting the external structure on the transparent plate, and
   wherein the external structure is a camera module.

16. The display device of claim 15, wherein the guide post comprises at least one seating portion having a structure which takes into account at least one property of viscosity, hardness, and adhesion of the adhesive.

17. The display device of claim 16, wherein a size, a shape, and a position of the seating portion are determined depending on a structure, a weight, and a material of the camera module.

18. The display device of claim 17, wherein the adhesive is not disposed between the bottom side of the seating portion and the transparent plate.

* * * * *